US008907859B2

(12) United States Patent
Hsu et al.

(10) Patent No.: US 8,907,859 B2
(45) Date of Patent: Dec. 9, 2014

(54) EDGE-EMITTING ANTENNAS FOR ULTRA SLIM WIRELESS MOBILE DEVICES

(75) Inventors: Hao-Han Hsu, Portland, OR (US);
Dong-Ho Han, Beaverton, OR (US);
Songnan Yang, San Jose, CA (US);
Anand S Konanur, San Jose, CA (US);
Chung-Hao Joseph Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 235 days.

(21) Appl. No.: 13/527,015

(22) Filed: Jun. 19, 2012

(65) Prior Publication Data
US 2013/0335284 A1    Dec. 19, 2013

(51) Int. Cl.
*H01Q 7/06*    (2006.01)
(52) U.S. Cl.
USPC ............................ 343/788; 343/702; 343/787
(58) Field of Classification Search
CPC ....... H01Q 7/08; H04B 5/0037; H04B 5/0081
USPC ......................................... 343/702, 787, 788
See application file for complete search history.

(56) References Cited

U.S. PATENT DOCUMENTS 4,131,824 A * 12/1978 Nakai et al. ................. 315/39.51
7,504,924 B2 * 3/2009 Inoue et al. .................... 336/234
7,668,575 B2 * 2/2010 Park et al. ..................... 455/575.1
8,106,844 B2 * 1/2012 Tsujimura et al. ............ 343/787
2008/0238799 A1 * 10/2008 Tsushima ....................... 343/788

FOREIGN PATENT DOCUMENTS

| JP | 2007-036691 A | 2/2007 | |
| JP | 2012-029258 A | 2/2012 | |
| JP | 2012-044592 A | 3/2012 | |
| JP | 2012044592 | * 3/2012 | ............... H01Q 7/00 |
| WO | 2013/191896 A1 | 12/2013 | |

OTHER PUBLICATIONS

International Search Report and Written opinion received for PCT Application No. PCT/US2013/044134, mailed on Aug. 23, 2013, 12 pages.

* cited by examiner

*Primary Examiner* — Tho G Phan
(74) *Attorney, Agent, or Firm* — Forefront IP Lawgroup, PLLC (57) ABSTRACT

Described herein are techniques related to near field coupling and wireless power transfers. A mobile device may include an edge-emitting antenna that offers ultra slim, all-metallic chassis packaging option with no cutout, uses lesser area, has robust mechanical strength, and provides EMI/ESD protection. In one example, an inductor coil is wrapped around a magnetic core and a pair of conductive layers is configured to interpose the magnetic core and the inductor coil between them to expose an edge of the magnetic core. The inductor coil being operable in a transmit mode to generate a magnetic field in response to a current passing through it. The edge is configured to enhance outward radiation of the magnetic field. Based on simulation results, the edge-emitting antenna occupies less space and provides an acceptable level of performance for coupling coefficients compared to conventional antenna.

20 Claims, 7 Drawing Sheets

FIG. 4 though not shown, the input device 118 may include a
EDGE-EMITTING ANTENNAS FOR ULTRA SLIM WIRELESS MOBILE DEVICES

BACKGROUND

Recently, technologies have arisen that allow near field coupling (e.g., wireless power transfers (WPT) and near field communications (NFC)) between mobile devices in close proximity to each other. Such near field coupling functions may use radio frequency (RF) antennas in the devices to transmit and receive electromagnetic signals. Because of user desires (and/or for esthetic reasons) many of these mobile or portable devices are small (and becoming smaller), and tend to have exaggerated aspect ratios when viewed from the side. As a result, many of these mobile devices incorporate flat antennas, which use coils of conductive material as their radiating antennas for use in near field coupling functions.

Most mobile devices such as cellular phones, pad and tablet computers, laptops, and Ultrabooks use metal chassis for providing robust mechanical strength, and for improved protection against electromagnetic interference (EMI) and/or electromagnetic static discharge (ESD). However, electromagnetic coupling between the two NFC antennas of the mobile devices to communicate with one another may degrade significantly if metal is present between the two antennas. This is due to the fact that metal acts as a shield and Eddy currents may be induced in the metal.

To improve communications coupling between the two NFC antennas, a conventional solution is to remove a conductive (or metal) coating and/or introduce a large cutout area in the metal chassis, thereby removing the shield for the magnetic field. However, the conventional solution while attempting to improve the coupling between the two NFC antennas also creates an unwanted reduction in the robustness of the mobile device and causes deterioration in the EMI/ESD performance of the mobile device. In addition, having a large cutout area in the conductive coating may not be a feasible option for many smaller sized mobile devices such as smartphones and Ultrabooks. Accordingly, there is a need for an improved NFC antenna configuration.

The following Detailed Description is provided with reference to the accompanying figures. In the figures, the leftmost digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for integrating an edge-emitting antenna in a mobile device. In an implementation, a mobile device may include an edge-emitting antenna that offers ultra slim, all-metallic chassis option with no cutout, uses lesser area, has robust mechanical strength, and provides EMI/ESD protection. In one example, a coil is wrapped around a magnetic core and a pair of conductive layers is configured to interpose the magnetic core and the coil between them to expose an edge of the magnetic core. The coil being operable in a transmit mode to generate a magnetic field in response to a current passing through it. The edge is configured to enhance outward radiation of the magnetic field. Based on simulation results, the edge-emitting antenna occupies less space and provides an acceptable level of performance for coupling coefficients compared to conventional NFC antenna.

Figure 1:
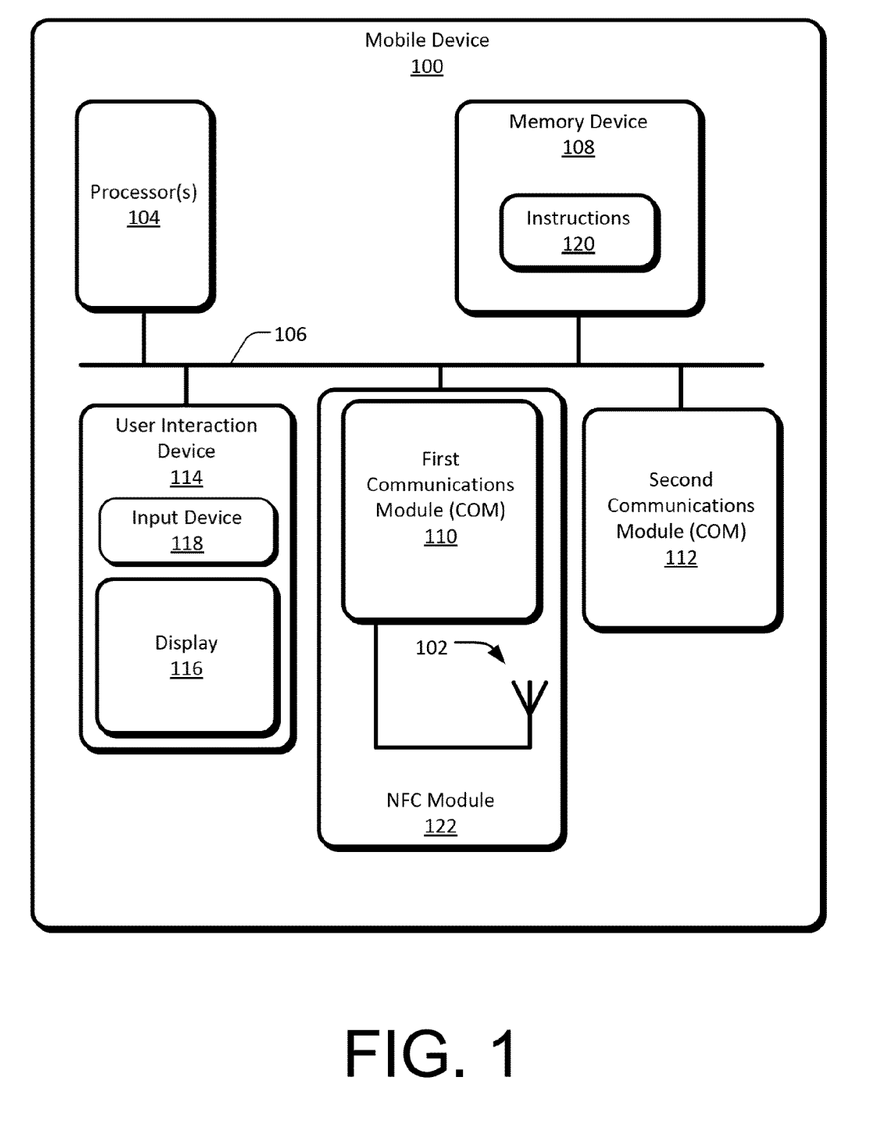
FIG. 1 is a block diagram illustrating an example mobile device that is configured with an edge-emitting antenna for near field communications.

FIG. 1A is a block diagram of a mobile device 100 that is configured with an edge-emitting antenna 102 for near field coupling. More particularly, users may have a desire to operate near field coupling enabled mobile electronic devices and/or other devices in certain ergonomically convenient manners. Examples of such mobile devices include, but are not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

In an implementation, the mobile device 100, which is a type of a computer system, includes a processor 104 coupled to a bus 106, a memory device 108 coupled to the processor via the bus 106, a first communications module (COM) 110 coupled to the processor 104 via the bus 106, a second COM 112 coupled to the processor 104 via the bus 106, and a user interaction device 114 coupled to the processor 104 via the bus 106. The first COM 110 is coupled to the edge-emitting antenna 102 to receive/transmit wireless signals.

The user interaction device 114 may include a display 116 and an input device 118 such as a touch screen, a mouse, a trackball, or similar other cursor positioning peripheral configured to receive user input. The display 116 is configured to provide a graphical user interface for user interaction. Although not shown, the input device 118 may include a smaller sized QWERTY type fixed keypad for user input. In some applications, the display 116 and the input device 118 may be configured as separate components that may be directly coupled to the bus 106.

It should be understood that depending on the computing load, more than one processor 104 may be included in the mobile device 100. The memory device 108 is operable to store instructions or commands 120 that are executable by the processor 104 to perform one or more functions. It should also be understood that the term "computer system" is intended to encompass any device having a processor that is capable of executing program instructions from a memory medium. Various functions, processes, method(s) 400, programs, and operations described herein may be implemented using the mobile device 100. For example, the processor 110 is operable to execute the instructions 120 stored in memory device 108 for establishing an initial 'NFC bump' operation between two NFC compatible devices (not shown).

The components of the mobile device 100 may be modules of computer-executable instructions, which are instructions executable on a computer, mobile device, or the processors of such devices. While shown here as modules, the components may be embodied as hardware, firmware, software, or any combination thereof. The techniques described herein may be performed, as a whole or in part, by hardware, software, firmware, or some combination thereof.

In some implementations, the mobile device 100 may provide support for NFC communications over shorter distances. The first COM 110 is configured to use the edge-emitting antenna 102 to wirelessly communicate over short distances using a first communication standard. The first communication standard may include the near field communications (NFC) standard configured to provide secure authenticated communications between two NFC compliant devices (not shown) located in close proximity. The first COM 110 when configured to support the NFC communications using the edge-emitting antenna 102 may be referred to as a NFC module 122.

The second COM 112 is configurable to wirelessly communicate with the communication network(s) using a second communication standard. The second communication standard may be based on IEEE 802.11 family of standards for wireless local area network (WLAN). The mobile device 100 may also be configured to support IEEE 802.16 family of standards for wireless broadband devices such as 2G, 3G or 4G cell phones with LTE or WiMAX capability.

Near Field Communication (NFC) is a short-range wireless standard that enables secure authenticated wireless communication between NFC compliant devices over a short distance of approximately 0-5 centimeters (with 0 centimeters indicating a physical contact). NFC is an ISO based standard. The ISO 14443 Type A and Type B standards+ FeliCa is a four-part international standard for contactless smart cards operating at 13.56 megahertz (MHz) in close proximity with a reader antenna. The ISO 18092 standard defines communication modes for NFC Interface and Protocol; however, embodiments are not limited to near field communications in accordance with this standard and other types of communications and standards and types may be employed.

In one implementation, the edge-emitting antenna 102, which is configured to operate at low frequencies (and large wavelengths), is often integrated into small portable or hand held devices. For example, in one application the edge-emitting antenna 102 may be configured to receive/transmit NFC signals operating around the 13.56 MHz frequency (having an equivalent wavelength of about 22 meters) and be limited to a size much less than about 3 centimeters×5 centimeters that is typical for a conventional NFC antenna. Additional detail of the edge-emitting antenna 102 is described with reference to FIGS. 2A, 2B, 2C, and 2D.

Figure 1B:
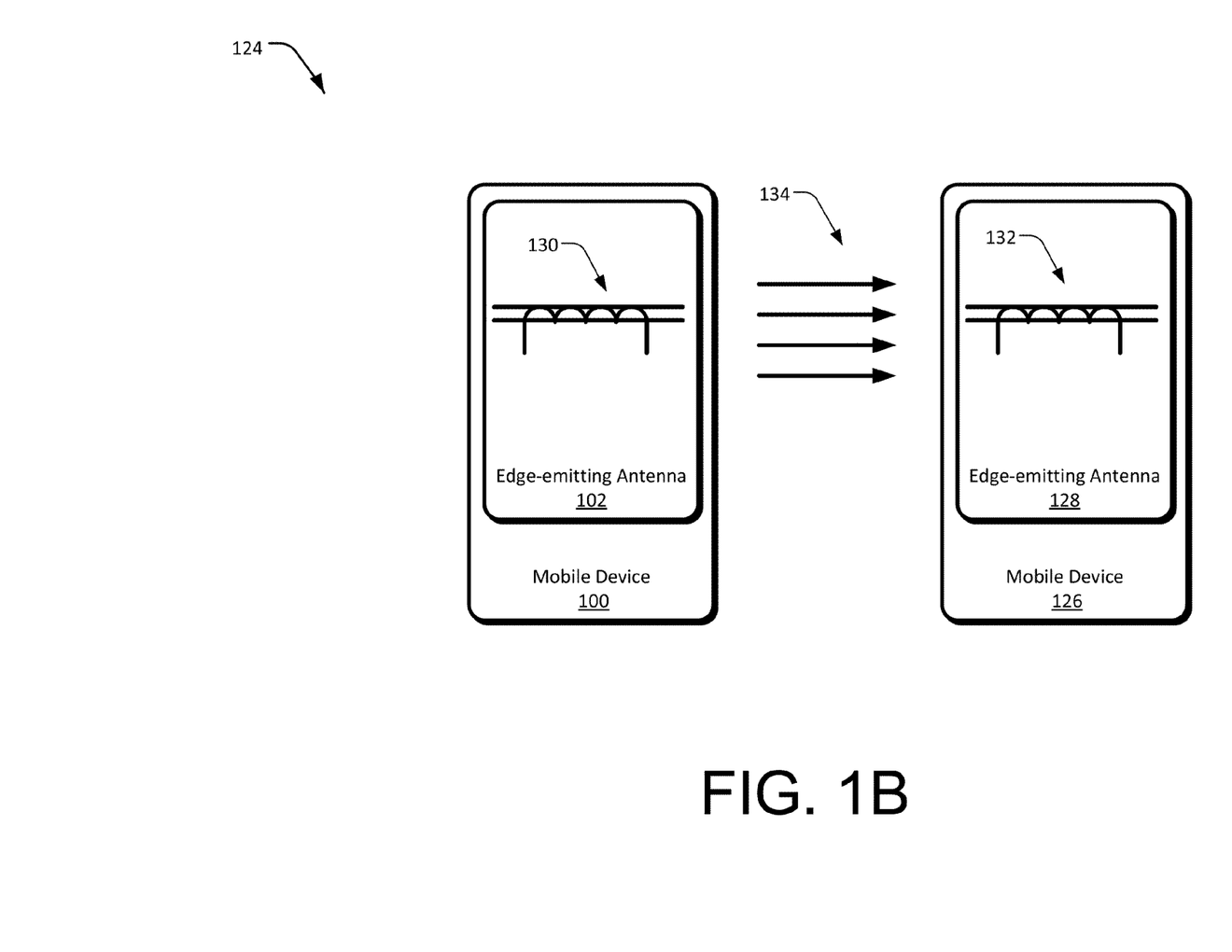
FIG. 1B is a block diagram of an example communication system to illustrate contactless energy transfer in WPT and/or NFC applications.

FIG. 1B is a block diagram of a communication system 124 to illustrate contactless energy transfer that is often required in WPT and/or NFC applications. The communication system 124 includes two mobile devices 100 and 126, each equipped with corresponding edge-emitting antennas 102 and 128 configured for NFC and/or WPT applications. The two mobile devices 100 and 126 and the edge-emitting antennas 102 and 128 may be configured to have substantially similar functions and features.

To achieve contactless energy transfer the edge-emitting antenna 102 may be configured to include an inductor coil 130 and the edge-emitting antenna 128 may be configured to include an inductor coil 132. When current passes through the inductor coil 130 it generates a magnetic field (or flux) 134. Contactless energy transfer is achieved when the magnetic field 134 generated by the edge-emitting antenna 102 (operating in a transmit mode) passes through or near the inductor coil 132 present in the edge-emitting antenna 128 (operating in a receive mode) and induces a current in the inductor coil 132 when the edge-emitting antennas 102 and 128 are positioned in close proximity to one another. The direction of the magnetic field 134 reverses when the edge-emitting antennas 102 and 128 reverse their operating mode.

The NFC standard enables data transactions, data exchange, and wireless communications between two NFC compliant mobile devices 100 and 126 in close proximity to each other. In a 'NFC bump' operation, NFC compliant mobile devices 100 and 126 may be configured to automatically discover one another. The mobile device 100 may be configured to query another NFC compliant mobile device 126 and automatically (e.g., without user intervention) establish the wireless link. Set up time for automatically pairing two NFC compliant devices is typically less than 1 millisecond. Compared to the NFC standard, the Bluetooth standard typically supports communication over longer distances (e.g., up to 30 meters) and requires a longer set up time (e.g., about 5-6 seconds). Communication is also possible between an NFC device and an unpowered NFC chip, described as a tag (as in a RFID tag).

In an implementation, the "NFC bump" where two users (not shown) "bump" their NFC-enabled mobile devices 100 and 126 together in an edge-to-edge or head-to-head manner to perform NFC-related information sharing functions. In other implementations, a corner-to-corner (not shown), or a front-to-back (not shown), or a back-to-back (not shown) manner may be performed for the "NFC bump." The two mobile devices 100 and 126 may also be configured in a side-by-side configuration for NFC and/or WPT purposes.

Figure 2A:
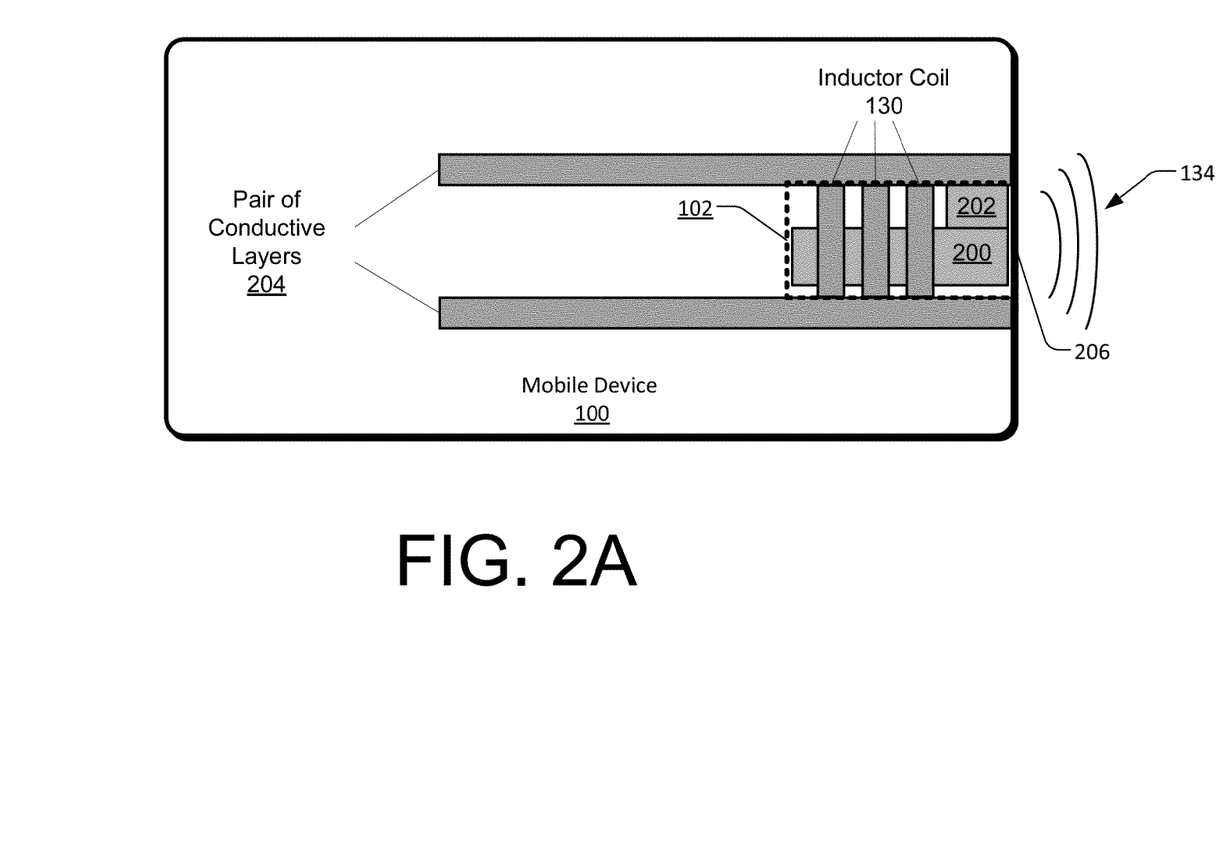
FIG. 2A illustrates a cross-sectional view of an example edge-emitting antenna integrated into a chassis of a mobile device.

FIG. 2A illustrates a cross-sectional view of an edge-emitting antenna 102 integrated into a chassis of the mobile device 100. In an implementation, the edge-emitting antenna 102 includes a magnetic core 200 and the inductor coil 130 that is wrapped around the magnetic core 200. The inductor coil 130 may be configured to include N number of turns, where N is an integer. In one implementation, N=5 turns. Other attributes of the inductor coil 130 such as orientation of the wrapping around the magnetic core 200 and thickness of the coil may vary depending on the requirements of each application. In one application, the inductor coil 130 may be wrapped around to cover a configurable portion of the magnetic core 200, e.g., a center portion of the magnetic core 200. Although not shown, the inductor coil 130 is coupled to the NFC module 122 described with reference to FIG. 1. The inductor coil 130 may be coupled to the NFC module 122 through the PCB, the FPC, or through wire connections.

Referring back to FIG. 2A, in one application, the magnetic core 200 may be configured to have a rectangular shape with dimensions of approximately 2 millimeters (thickness) by 4 centimeters (length) generating an aspect ratio of about 1:20. No bending of the magnetic core 200 may be required to achieve a minimal footprint.

The inductor coil 130 is operable in a transmit mode to generate the magnetic field 134 in response to a current passing through the inductor coil 130. The magnetic core 200 may be fabricated from ferrite material (typically in a form of a stack of thin laminates) having permeability in the range of 200 to 400. Higher permeability of the magnetic core 200 may enhance the strength and distribution of the magnetic field 134. The inductor coil 130 may be made out of a printed circuit board (PCB), a flexible printed circuit (FPC), a metal wire, created through a laser direct structuring (LDS) process, or directly printed onto a ferrite material.

The edge-emitting antenna 102 may be integrated into the mobile device 100 by interposing the magnetic core 200 and the inductor coil 130 between a pair of conductive layers 204 to expose an edge 206 of the magnetic core 200. The pair of conductive layers 204, which may be fabricated from metallic material, may be configured as an integral part of the chassis for the mobile device 100. The pair of conductive layers 204 may be configured to provide a robust and durable all-metal packaging option with no cutout requirements. The pair of conductive layers 204 may also offer excellent mechanical strength, and provide EMI/ESD protection to the device. Overall dimensions, packaging, and layout of the edge-emitting antenna 102 may configured to function as a dedicated antenna for NFC and/or WPT purposes.

As an option, a magnetic plate 202 may be formed on the outer side of the edge 206 of the magnetic core 200. The increased dimension/area of the edge 206 by adding the magnetic plate 202 may enhance the outwardly radiation of the magnetic field 134 from the edge 206. In one implementation, a thickness of the optional magnetic plate 202 may be configured to be approximately equal to 5 millimeters. The magnetic field 134 generated by the inductor coil 130 is conducted by the magnetic core 200 and oriented outwards of the metal chassis used to fabricate the mobile device 100. Thus, there is more flexibility in configuring a loop number and inductance of the inductance coil 130 compared to the conventional NFC antenna. This facilitates required impedance-matching between the antenna and NFC module for each application.

The ferrite material that may be used in the magnetic core 200 and the magnetic plate 202 protects the edge-emitting antenna 102 from Eddy currents that may be generated by the pair of conductive layers 204, and blocks magnetic fields at the edge-emitting antenna 102 from penetrating the pair of conductive layers 204.

Figures 2B, 2C, 2D:
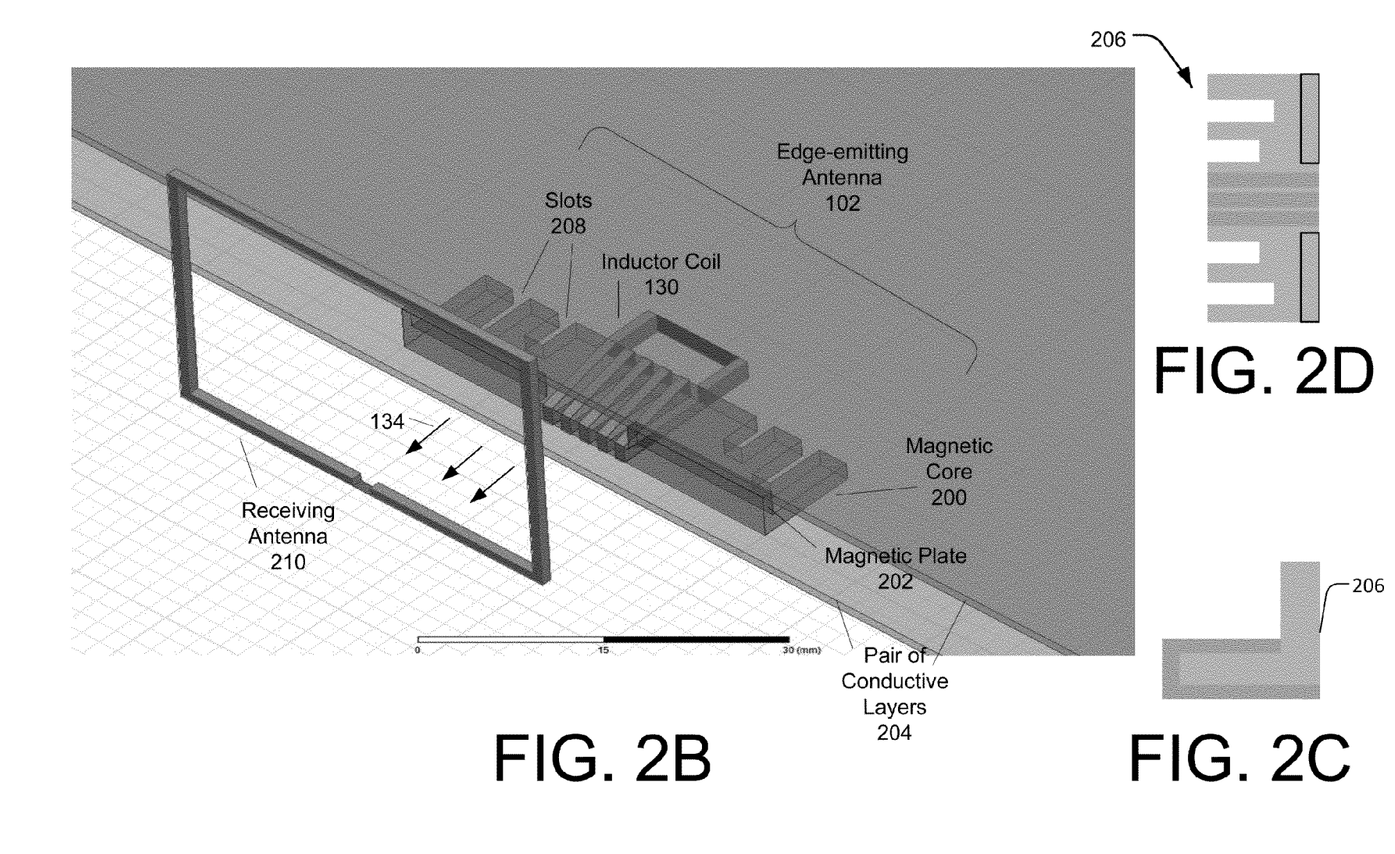
FIG. 2B illustrates an isometric view of an example edge-emitting antenna integrated into a mobile device.
FIG. 2C illustrates an cross-sectional view of an example edge-emitting antenna integrated into a mobile device.
FIG. 2D illustrates an top view of an example edge-emitting antenna integrated into a mobile device.

FIGS. 2B, 2C, and 2D respectively illustrate an isometric, cross-sectional, and a top view of an edge-emitting antenna 102 integrated into the mobile device 100. Referring to FIGS. 2B, 2C, and 2D, the edge-emitting antenna 102 includes the magnetic core 200 and the inductor coil 130 that is wrapped around the magnetic core 200. The inductor coil 130 is shown to include 5 turns. The magnetic core 200 may be configured to include one or more slots 208. A slot may be formed by stamping out a rectangular shaped portion of the magnetic core 200. Slots may be added to enhance the outwardly radiation of the magnetic field 134 from the edge 206. The number of slots included in the magnetic core 200 may be configurable for each application.

As described earlier with reference to FIG. 2A, the edge-emitting antenna 102 may be integrated into the mobile device 100 by interposing the magnetic core 200 and the inductor coil 130 between the pair of conductive layers 204 to expose the edge 206 of the magnetic core 200. In one implementation, the edge-emitting antenna 102 may be placed slightly inside an edge of the pair of conductive layers 204 for protection purpose.

Referring back to FIGS. 2B, 2C, and 2D, a receiving antenna 210 that may be located in another NFC compliant device (not shown) may be placed in close proximity to the edge 206. The magnetic field 134 that is outwardly radiating from the edge-emitting antenna 102 through the edge 206 is traversed by the receiving antenna 210. This induces a current flow in the receiving antenna 210 and NFC communication may be established between the edge-emitting antenna 102 (controlled by the mobile device 100) and the receiving antenna 210 (controlled by another NFC compliant mobile device).

Proper orientation and positioning between the edge-emitting antenna 102 and the receiving antenna 210 may be desired to optimize coupling and maximize signal strength. Additional detail of the magnetic field 134 that may be present between the edge-emitting antenna 102 and the receiving antenna 210 is described with reference to FIG. 3A. In particular, orientation and positioning that metal layers are in-plane with one another, such that magnetic flux is not blocked. In other words, in-plane provides that the receiving antenna is parallel to the metal layers.

Figure 3A:
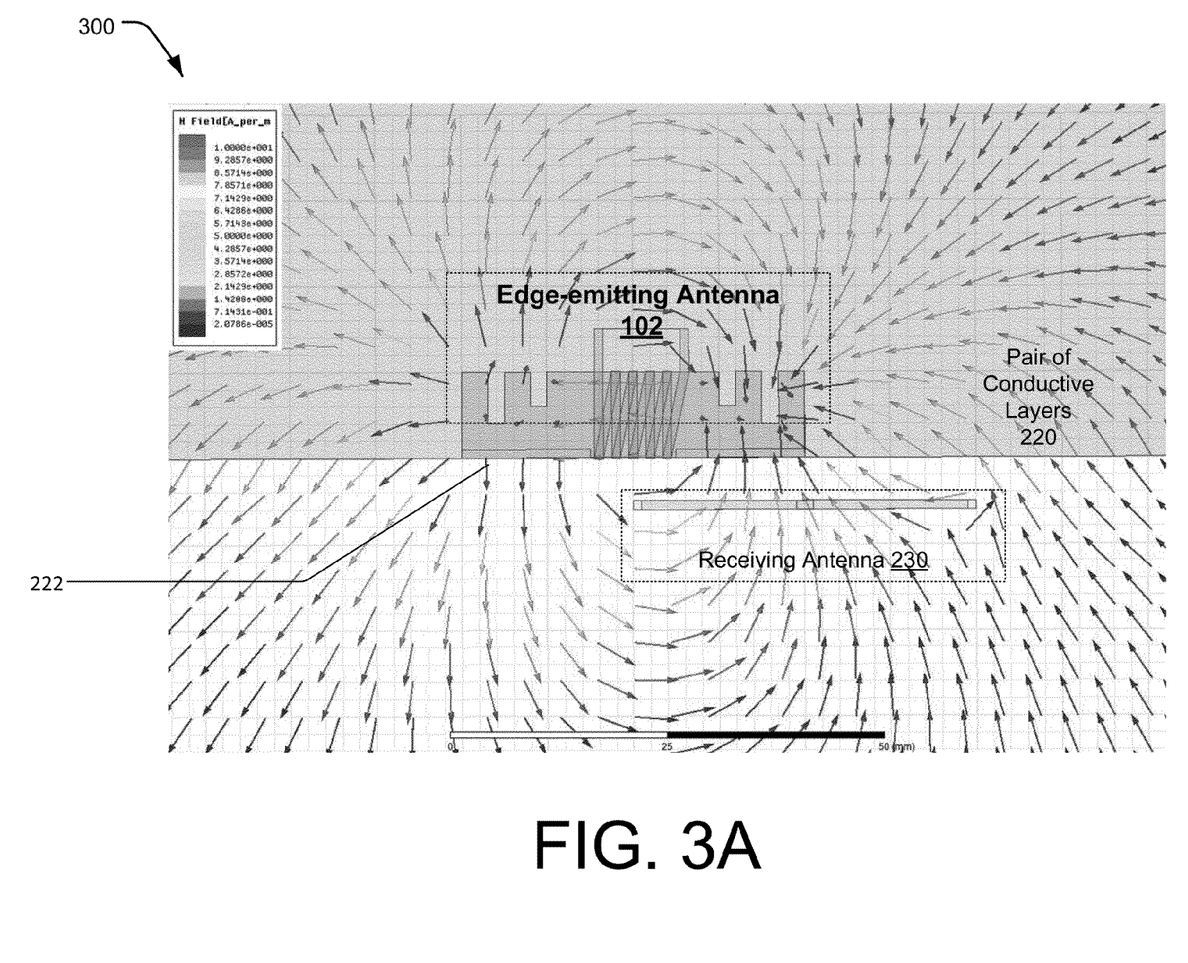
FIG. 3A is a graphical illustration of an example simulated magnetic field that is generated by an edge-emitting antenna.

FIG. 3A is a graphical illustration of a simulated magnetic field 300 that is generated by an edge-emitting antenna 102. The simulated magnetic field 300, which substantially replicates actual distribution of the magnetic field 134, was generated using a commercially available software simulation tool such as Ansoft HFSS. The simulated magnetic field 300 shows that the magnetic field travels outside from the chassis edge, e.g., edge 206, and is not affected by the metal chassis. A large portion of the magnetic flux is picked up by the receiving antenna 210. Even though leakage of the magnetic flux flowing inward is observed, a sufficient level of communication may be established between the antennas even when the antennas operate within a close proximity of a metal chassis.

Figure 3B:
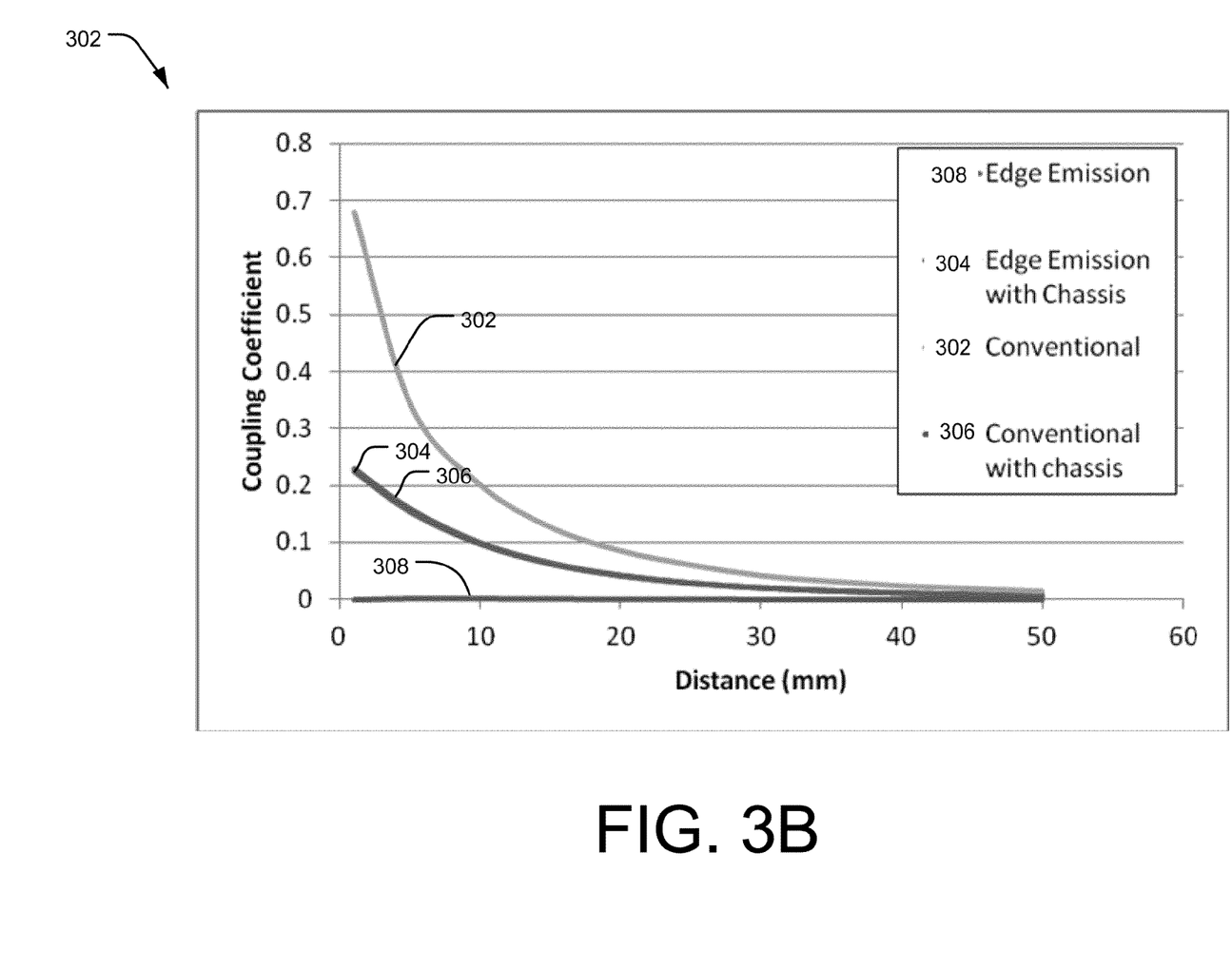
FIG. 3B illustrates an example graphical X-Y plot between a coupling coefficient (shown on Y-axis) and a distance between a sending antenna and a receiving antenna (shown on X-axis).

FIG. 3B illustrates a graphical X-Y plot 302 between a coupling coefficient (shown on Y-axis) and distance between a sending antenna and a receiving antenna (shown on X-axis) using a software simulation tool. Referring to FIGS. 3A and 3B, the simulated graphical plot 302 between the coupling coefficient K between 2 NFC antennas as a function of the distance separating the 2 NFC antennas is generated using a commercially available software simulation tool such as Ansoft HFSS. In the simulated plot 302, a conventional NFC antenna and the edge-emitting antenna 102 are compared with and without a presence of a metal chassis. The chassis may include the pair of conductive layers 204 composed of two 1-mm metal sheets separated by 10 mm. The coupling coefficient (K) between 2 inductor coils is calculated by Equation (1) (using the 2-port Z-parameters obtained by Ansoft HFSS):

$$K = \sqrt{\frac{\text{Im}(Z_{21})\text{Im}(Z_{12})}{\text{Im}(Z_{11})\text{Im}(Z_{22})}} \qquad \text{Equation (1)}$$

It is desired that the coupling coefficient K between the two NFC antennas be higher than approximately 0.05 to assure proper operation. The conventional NFC planar coil antenna exhibits strong coupling coefficient value in free space. The typical maximum distance between the NFC antennas is about 30-50 mm. However, the coupling coefficient K becomes less than 0.01 when the conventional antenna is placed in a metal chassis. Therefore, a conventional NFC antenna placed in a metal chassis becomes inoperable unless a large chassis cutout is made.

The coupling coefficient K of the edge-emitting antenna 102 is lower compared to a conventional NFC antenna with chassis cutout since the coupling coefficient directly depends on the exposed antenna area. In many implementations, small packaging requirements often limit the thickness (or z-height) of mobile devices to a few millimeters. A safe allowable distance between the two NFC antennas (when the transmitting antenna is the edge-emitting antenna 102) is about 25 mm in one application. The coupling coefficient and working distance may be further optimized by: (a) adopting a thicker magnetic core and (b) utilizing materials with higher permeability. The graphical plot 302 also shows that the metal chassis has negligible effects on the performance of the edge-emitting antenna 102.

Figure 4:
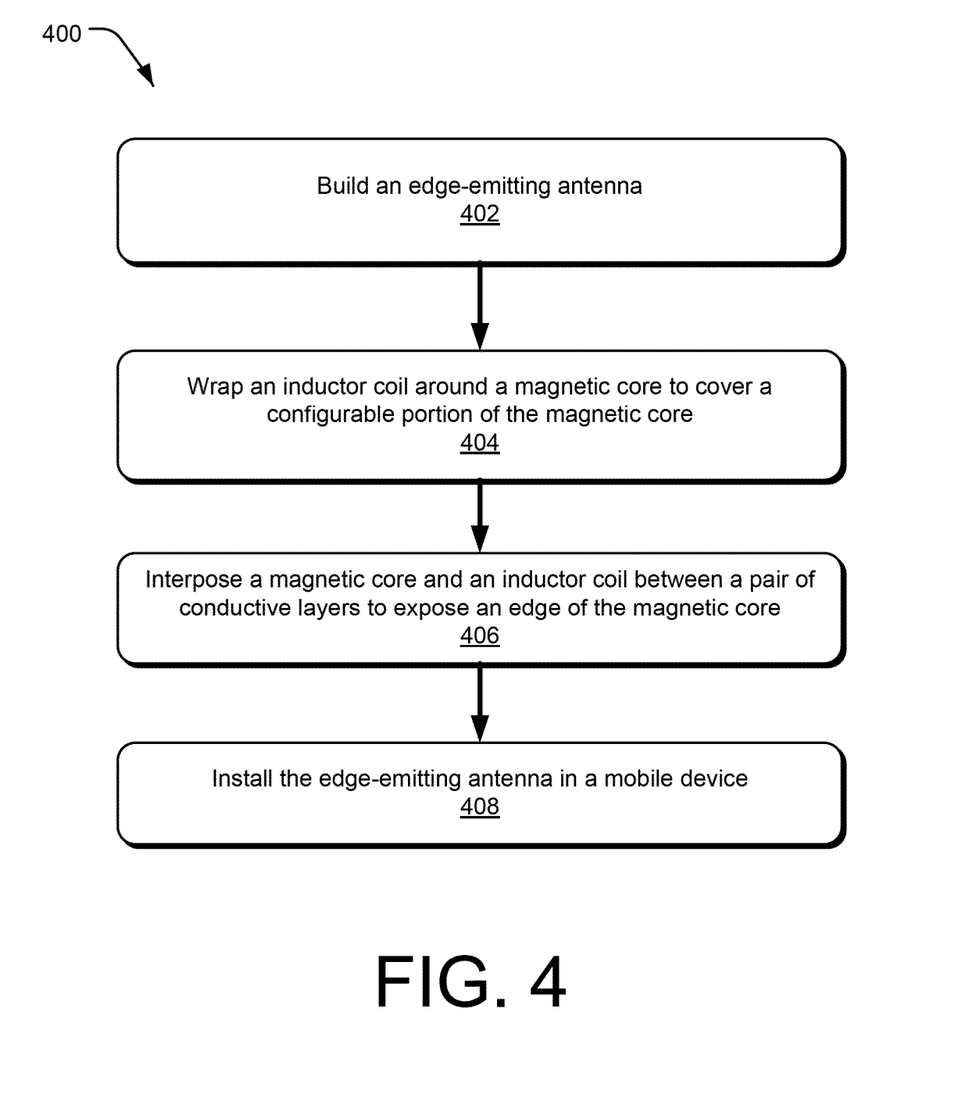
FIG. 4 shows a process chart illustrating an example method for integrating an edge-emitting antenna into a mobile device.

FIG. 4 shows an example process chart illustrating an example method 400 for integrating an edge-emitting antenna into a mobile device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, building an edge-emitting antenna is performed. In an implementation, the building of the edge-emitting antenna may include blocks 404 and 406. At block 404, wrapping an inductor coil around a magnetic core to cover a configurable portion of the magnetic core is performed. At block 406, interposing the magnetic core and the inductor coil between a pair of conductive layers to expose an edge of the magnetic core, wherein a chassis that includes the pair of conductive layers is configured to be fully metallic with no cutout is performed. At block 408, installing the edge-emitting antenna in a mobile device is performed.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments. In an implementation an antenna comprising: a magnetic core; an inductor coil wrapped around the magnetic core, the inductor coil being operable in a transmit mode to generate a magnetic field in response to a current passing through the inductor coil; and a pair of conductive layers configured to interpose the magnetic core and the inductor coil between them to expose an edge of the magnetic core, the edge being configured to outwardly radiate the magnetic field.

In an implementation further comprising a magnetic plate formed on an outer side of the edge, wherein the magnetic plate is configured to enhance the outwardly radiation of the magnetic field.

In an implementation wherein the magnetic field is blocked by the pair of conductive layers.

In an implementation wherein an aspect ratio of the magnetic core is 1:20.

In an implementation, wherein the pair of conductive layers include at least one of an electromagnetic interference (EMI) coating and an electrostatic discharge (ESD) protection that shields electrical components of a wireless mobile device.

In an implementation, wherein the current is generated by a communications module configured to communicate in accordance with at least one of near field coupling (NFC) communication and wireless power transfer (WPT) standards.

In an implementation, wherein the magnetic field that is outwardly radiated is received by a receiving antenna, the receiving antenna being oriented in a receiving plane that is not parallel to a transmitting plane formed by the pair of conductive layers.

In an implementation, wherein the pair of conductive layers are included in a chassis of a mobile device, the chassis being configured to be free from a cutout section.

In an implementation, wherein the magnetic plates and the magnetic core is fabricated from a ferrite material.

In an implementation, wherein the inductor coil is operable in a receive mode to traverse the magnetic field and generate an induced current through the inductor coil.

In an implementation a method of integrating an edge-emitting antenna into a mobile device, the method comprising: building the edge-emitting antenna, the building comprising: wrapping an inductor coil around a magnetic core to cover a configurable portion of the magnetic core; interposing the magnetic core and the inductor coil between a pair of conductive layers to expose an edge of the magnetic core, wherein a chassis that includes the pair of conductive layers is configured to be fully metallic with no cutout; and installing the edge-emitting antenna in a mobile device.

In an implementation, wherein the building includes fabricating the inductor coil that is made out of a printed circuit board (PCB), a flexible printed circuit (FPC), a metal wire, created through a laser direct structuring (LDS) process, or directly printed onto a ferrite material.

In an implementation wherein the ferrite material protects the edge-emitting antenna from Eddy currents that are generated by the pair of conductive layers, and blocks magnetic fields at the edge-emitting antenna from penetrating the pair of conductive layers.

In an implementation wherein the pair of conductive layers are included in a chassis of the mobile device, the chassis being configured to be free from a cutout section.

In an implementation a mobile device comprising: a magnetic core; an inductor coil wrapped around the magnetic core, the inductor coil being operable in a transmit mode to generate a magnetic field in response to a current passing through the inductor coil; a pair of conductive layers configured to interpose the magnetic core and the inductor coil between them to expose an edge of the magnetic core, the edge being configured to outwardly radiate the magnetic field; and a near field coupling (NFC) module coupled to the inductor coil.

In an implementation wherein the inductor coil is made out of a printed circuit board (PCB), a flexible printed circuit (FPC), a metal wire, created through a laser direct structuring (LDS) process, or directly printed onto the ferrite material.

In an implementation wherein the inductor coil antenna is coupled to a near field coupling (NFC) module through the PCB, the FPC, or through wire connections.

In an implementation, further comprising a magnetic plate formed on an outer side of the edge, wherein the magnetic plate is configured to enhance the outwardly radiation of the magnetic field.

In an implementation, further comprising the magnetic core having a configurable number of slots, wherein the configurable number of slots enhance the outwardly radiation of the magnetic field.

In an implementation, wherein the inductor coil is operable in a receive mode to traverse the magnetic field and generate an induced current through the inductor coil.

What is claimed is:

1. An antenna comprising:
   a magnetic core;
   an inductor coil wrapped around a center of the magnetic core, the inductor coil being operable in a transmit mode to generate a magnetic field in response to a current passing through the inductor coil; and
   a pair of conductive layers configured to interpose the magnetic core and the inductor coil between them to expose an edge of the magnetic core with the wrapped inductive coil, the edge being configured to outwardly radiate the magnetic field.

2. The antenna as recited in claim 1, further comprising a magnetic plate formed on an outer side of the edge, wherein the magnetic plate is configured to enhance the outwardly radiation of the magnetic field.

3. The antenna as recited in claim 1 wherein the magnetic field is blocked by the pair of conductive layers.

4. The antenna as recited in claim 1, wherein an aspect ratio of the magnetic core is 1:20.

5. The antenna as recited in claim 1, wherein the pair of conductive layers include at least one of an electromagnetic interference (EMI) coating and an electrostatic discharge (ESD) protection that shields electrical components of a wireless mobile device.

6. The antenna as recited in claim 1, wherein the current is generated by a communications module configured to communicate in accordance with at least one of near field coupling (NFC) communication and wireless power transfer (WPT) standards.

7. The antenna as recited in claim 1, wherein the magnetic field that is outwardly radiated is received by a receiving antenna, the receiving antenna being oriented in a receiving plane that is not parallel to a transmitting plane formed by the pair of conductive layers.

8. The antenna as recited in claim 1, wherein the pair of conductive layers are included in a chassis of a mobile device, the chassis being configured to be free from a cutout section.

9. The antenna as recited in claim 1 wherein the magnetic plates and the magnetic core is fabricated from a ferrite material.

10. The antenna as recited in claim 1, wherein the inductor coil is operable in a receive mode to traverse the magnetic field and generate an induced current through the inductor coil.

11. A method of integrating an edge-emitting antenna into a mobile device, the method comprising:
    building the edge-emitting antenna, the building comprising:
        wrapping an inductor coil around a center of a magnetic core to cover a configurable portion of the magnetic core;
        interposing the magnetic core and the inductor coil between a pair of conductive layers to expose an edge of the magnetic core, wherein a chassis that includes the pair of conductive layers is configured to be fully metallic with no cutout; and
    installing the edge-emitting antenna in a mobile device.

12. The method as recited in claim 11, wherein the building includes fabricating the inductor coil that is made out of a printed circuit board (PCB), a flexible printed circuit (FPC), a metal wire, created through a laser direct structuring (LDS) process, or directly printed onto a ferrite material.

13. The method as recited in claim 11 wherein the ferrite material protects the edge-emitting antenna from Eddy currents that are generated by the pair of conductive layers, and blocks magnetic fields at the edge-emitting antenna from penetrating the pair of conductive layers.

14. The method as recited in claim 11 wherein the pair of conductive layers are included in a chassis of the mobile device, the chassis being configured to be free from a cutout section.

15. A mobile device comprising:
    a magnetic core;
    an inductor coil wrapped around a center of the magnetic core, the inductor coil being operable in a transmit mode to generate a magnetic field in response to a current passing through the inductor coil;
    a pair of conductive layers configured to interpose the magnetic core and the inductor coil between them to expose an edge of the magnetic core with the wrapped inductive coil, the edge being configured to outwardly radiate the magnetic field; and
    a near field coupling (NFC) module coupled to the inductor coil.

16. The mobile device as recited in claim 15, wherein the inductor coil is made out of a printed circuit board (PCB), a flexible printed circuit (FPC), a metal wire, created through a laser direct structuring (LDS) process, or directly printed onto the ferrite material.

17. The mobile device as recited in claim 16 wherein the inductor coil antenna is coupled to a near field coupling (NFC) module through the PCB, the FPC, or through wire connections.

18. The mobile device as recited in claim 15, further comprising a magnetic plate formed on an outer side of the edge, wherein the magnetic plate is configured to enhance the outwardly radiation of the magnetic field.

19. The mobile device as recited in claim 15, further comprising the magnetic core having a configurable number of slots, wherein the configurable number of slots enhance the outwardly radiation of the magnetic field.

20. The mobile device as recited in claim 15, wherein the inductor coil is operable in a receive mode to traverse the magnetic field and generate an induced current through the inductor coil.

* * * * *